May 27, 1941.　　　D. D. DUTTER　　　2,243,456
FOLLOW-UP MECHANISM
Filed Aug. 14, 1939　　　3 Sheets-Sheet 3
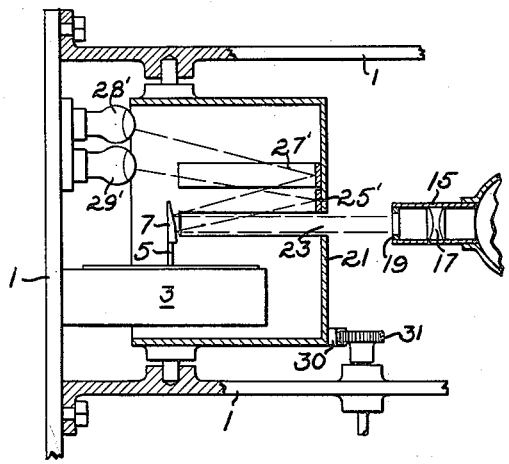
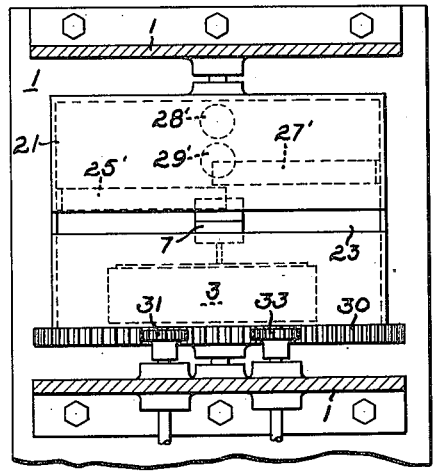
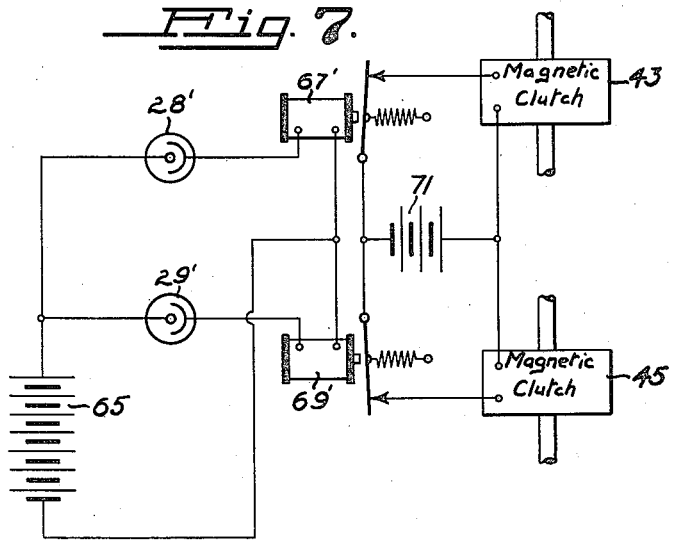
INVENTOR,
DONALD D. DUTTER.
BY Lippincott + Metcalf
ATTORNEYS.

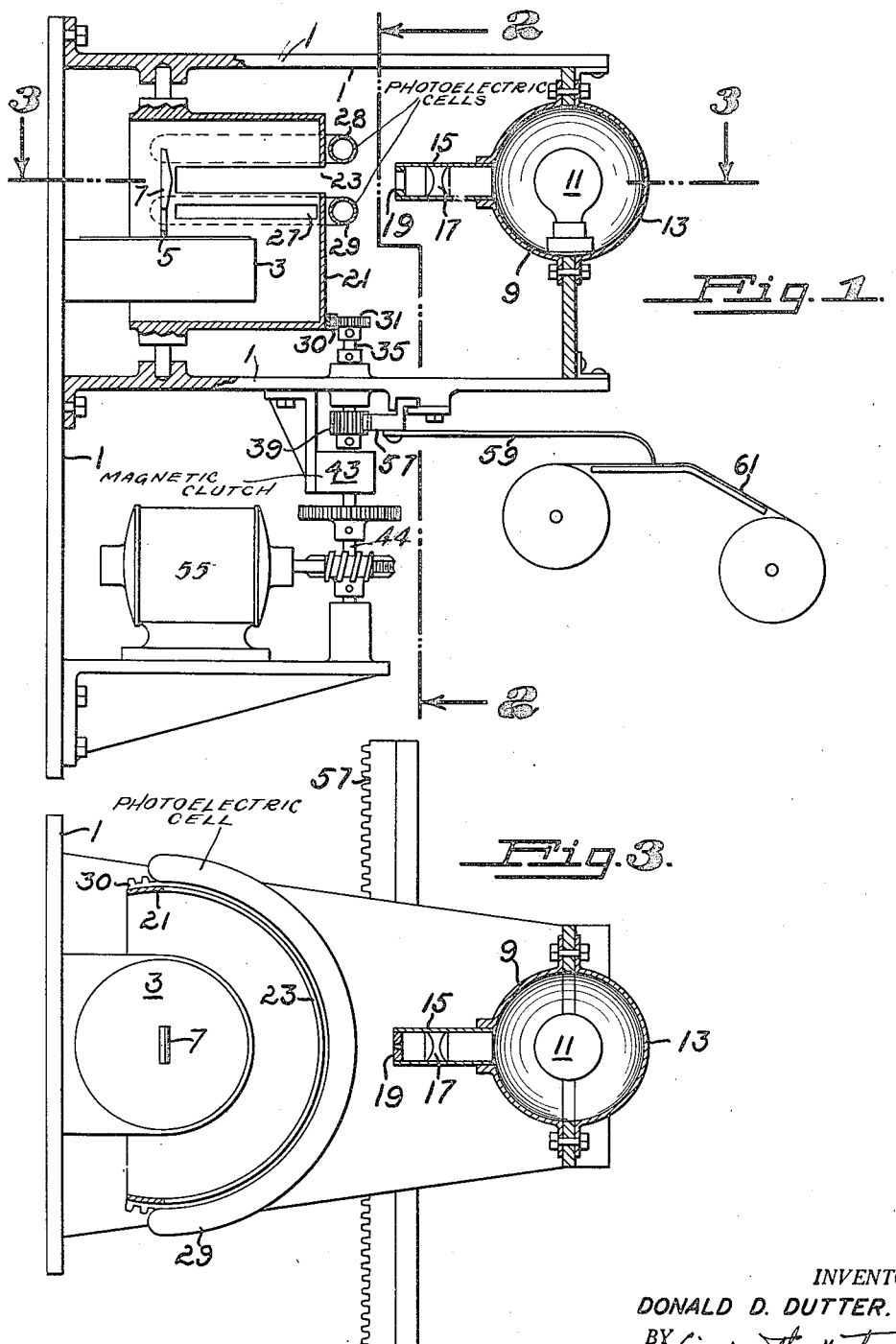

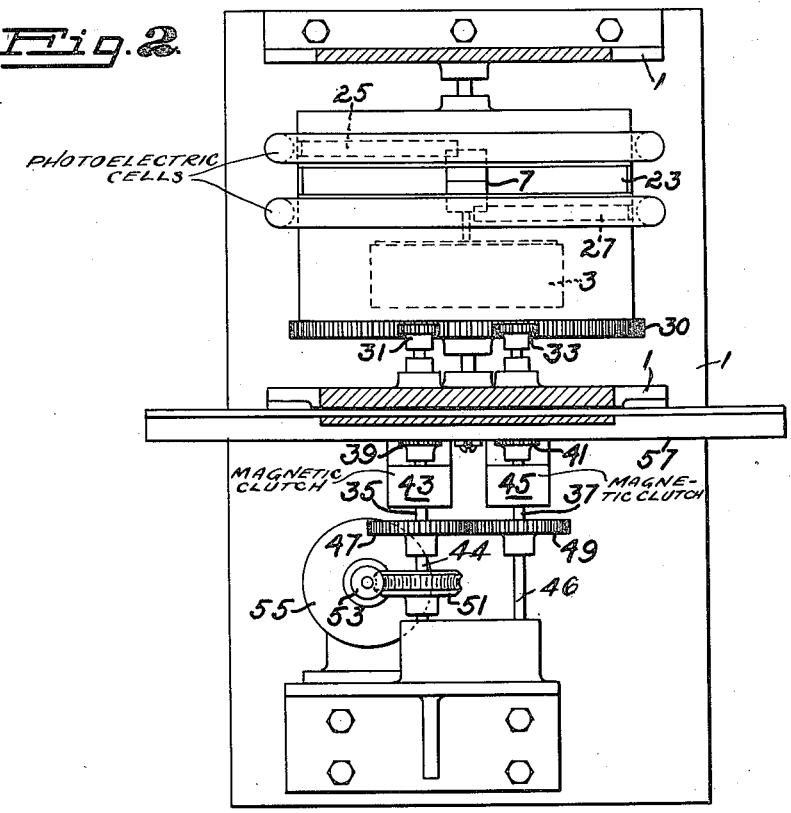
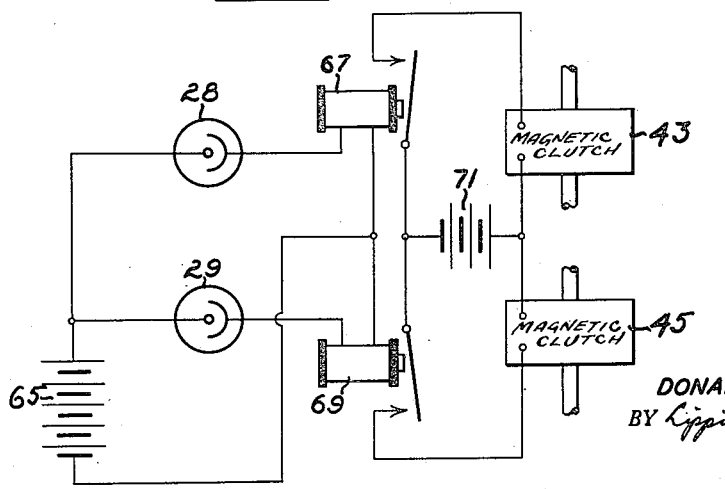

Patented May 27, 1941

2,243,456

UNITED STATES PATENT OFFICE 2,243,456

FOLLOW-UP MECHANISM

Donald D. Dutter, Big Creek, Calif.

Application August 14, 1939, Serial No. 290,139

8 Claims. (Cl. 250—41.5)

This invention relates to follow-up devices for meters, and particularly to such devices as used in recording instruments.

Among the objects of this invention are: To provide a device which may be used in connection with a sensitive instrument in order to actuate recording or control mechanism and which will impose no load whatsoever upon the said instrument; to provide a device of the character described which is operative in connection with any type of indicating instrument, whether electrically or mechanically actuated; to provide a device which may be as rapid or as sluggish in action as may be desired; to provide a device which does not depend upon an accurate circuit balance in order to give accurate readings; to provide a device which may be used to make recordings with either a uniform or a non-uniform scale, as may be desired and to provide a device which is simple and rugged in construction and unlikely to get out of order.

Other objects of my invention will be apparent or will be specifically pointed out in the description forming a part of this specification, but I do not limit myself to the embodiment of the invention herein described, as various forms may be adopted within the scope of the claims.

Considered broadly, my invention comprises an indicating meter or gauge adapted to measure the particular quantity, electrical or mechanical, which it is desired to record or to use as a control, and which has, substituted for the customary index hand, means for projecting a beam of light in lieu of such index. This projection means may be either a mirror or a collimating slit or any of the other equivalents.

Mounted in the path of the index beam is a member which is divided into two zones, the member being movable so that the transition point between these zones may be brought into alinement with the beam whatever its position within the range of the meter or gauge. Also mounted in the range of movement of the beam with respect to said movable member, is a photo-sensitive cell (i. e., a photoelectric, photo-conductive or photo-voltaic cell) the disposition of the cell with respect to the member being such that when the beam falls on one zone of the movable member the cell will be illuminated, whereas when the beam falls on the other zone it will be occulted with respect to said cell. Driving means are provided for moving the member, and said driving means is in turn controlled by the cell in such manner that illumination or occultation of the cell by the respective zones will actuate said driving means in the proper direction to bring the transition point between said zones into the path of the beam. Recording or control mechanism is connected to the light control member, and hence is actuated by the driving mechanism without imposing any load on the meter element.

In the preferred form of the device the movable member is dual in construction, and two photo-cells are provided, one of which is occulted while the other is illuminated, and vice versa. With this arrangement either both cells may be occulted at the transition point or both may be illuminated, depending upon the manner of their connection to the driving means. Where only a single cell is used hunting will usually occur across the transition point, but there are some applications where this is not a material disadvantage and it permits a cheaper construction, owing to the elimination of one photo-cell and (usually) one relay. As stated above, however, in most situations, the double cell arrangement is preferable.

Referring to the drawings, Figure 1 is a transverse vertical section through a preferred embodiment of my device.

Figure 2 is a vertical section taken along the line 2—2 of Figure 1.

Figure 3 is a horizontal sectional view of the device, the plane of section being on the line 3—3 of Figure 1.

Figure 4 is a circuit diagram showing in schematic form one of the simplest of the many operating circuits which may be used in connection with my invention.

Figure 5 is a fragmentary view similar to a portion of Fig. 1, showing a modification of the invention wherein reflecting instead of transmitting apertures are used.

Figure 6 is a front elevation of the modification shown in Fig. 5.

Figure 7 is a schematic diagram showing a modified operating circuit.

Considering in detail the form of device shown in the drawings, a mounting frame 1 is provided for supporting and housing the entire device. Secured to this frame is the meter 3 which may be a pressure gauge, a barometer, thermometer, or an electric indicating meter of any type, one of the primary advantages of my invention being that it is not limited in its usefulness to electrical meters.

Mounted upon the index shaft 5 of the meter, is a mirror 7 which is shown as having two plane facets, oppositely inclined to the vertical so that a parallel beam of light directed against the mirror will be divided upon reflection into two portions, one directed upwardly and the other directed downwardly.

Supported from the front of the frame 1 is a lamp housing 9 within which is mounted a light source 11, preferably an incandescent lamp. The housing is provided with a rear cover plate 13 which is removable for the replacement or servicing of the lamp and which is preferably provided with a reflecting internal surface which tends to focus the light falling upon it into a collimating tube 15. Within this tube is mounted suitable optical equipment for concentrating the light into a fine beam or pencil, for example, a condenser 17 for parallelizing the light, and a diaphragm 19 provided with a collimating slit which directs the beam from the source 1 upon the mirror 7.

Journaled upon the frame coaxially with the shaft 5 of the meter is the movable member or shutter drum 21. This drum is shown as subtending an arc of approximately 180°, but this arc may be varied in accordance with the angular range of the meter shaft. It is provided with a slot or opening 23 extending over nearly the entire circumference of the drum for admitting the light from the collimator to the mirror irrespective of the position of the drum.

Above and below the slot 23 are two additional slots 25 and 27, each approximately half as long as the slot 23, the slot 25 being positioned above the slot 23 and to the left of the median line of the drum while the slot 27 is positioned below and to the right of the median line. In the device shown, neither slot extends quite to the dividing line, so that there is a transition point or position of the drum with respect to the light reflected from the mirror where neither the upper nor the lower beam passes through a slot.

Mounted in front of the two slots are a pair of arcuate photocells 28 and 29, each substantially surrounding the drum when it is in its median position, so that irrespective of the position of the drum it is possible, if the reflected beam is not upon the transition point between the slots 25 and 27, for the light to fall upon one or the other of the two photocells, but not upon both of them. This portion of the device thus far described is, when in use, housed in a light proof casing (not shown).

The lower edge of the drum is provided with a spur gear segment 30. This segment meshes with two pinions 31 and 33, each of these pinions being mounted on an interrupted shaft which extends vertically through the floor of the casing, or frame 1. These shafts, 35 and 37 respectively, each carry an additional pinion 39 and 41 and in each is inserted a magnetic clutch 43 and 45. Mounted on the two extensions 44 and 46 of these shafts below the clutches are equal spur gears 47 and 49 which mesh to drive the two shafts in opposite directions. The shaft 44 serves as the driving shaft and is itself driven by a wormwheel 51 actuated by worm 53 which is mounted upon the shaft of a constant speed motor 25.

Each of the two pinions 39 and 41 meshes with a rack 57. This rack carries a syphon pen 59 or other recorder which engages a clock driven paper chart 61. This chart and its driving mechanism are of conventional form and are shown schematically, since this drive forms no part of my invention.

The photocells 28 and 29 may be either of the vacuum, electron emissive type, or they may be selenium, or photoconductive cells. If the true photoelectric cell (electron emissive) be used, it will ordinarily be necessary to amplify their output in order to operate a relay, and this invention contemplates the use of such amplifiers where necessary. Selenium cells are cheaper and will pass sufficient current so that a simple circuit such as that shown in Figure 4 may be used. Such a circuit includes the cells 28 and 29, supplied by a common battery 65 or other source of current. In series with each cell is a simple relay 67 and 69 respectively, in the present instance arranged to close a control circuit when the cell is illuminated. For simplicity the relay circuits are shown as being actuated by a separate battery source 71, each relay being connected to actuate one of the magnetic clutches 43 and 45.

The operation of the device will be readily understood from its construction. The collimated beam of light from the source 1 enters at all times through the slot 23 and falls upon mirror 7. If the meter is deflected one of the two beams into which the mirror divides the infalling light falls upon one of the slots 25 or 27. If the deflection is in such direction as to fall upon the slot 25 it illuminates the cell 28, operating the relay 67 and engaging the clutch 43 which rotates the drum to the left, as viewed from the front, until the end of the slot 25 cuts off the beam, allowing the relay 67 to open, disengaging the clutch 43 and bringing the drum to rest. A deflection of the meter in the opposite direction would illuminate the cell 29 through the slot 27 and cause the drum to rotate in the opposite direction through the action of the relay 69 and the clutch 45. If the deflection of the meter is linear with respect to the quantity to be measured, the deflection of the beam will also be linear and the drum will rotate proportionately to the intensity of the measured quantity. The rack 57 will also be moved a proportional distance transversely, moving the pen 59, and permitting uniform division on the chart 61. If other than concentric rotational movement is given to the shutter the exact linearity will be upset to a degree which can readily be computed from the nature of the movement and the laws of reflection, as will be obvious to those skilled in the art.

If the apertures 25 and 27 are each made slightly longer so they reach or overlap the median line and so that both cells are illuminated at the transition point, as is shown in connection with the reflecting apertures illustrated in Figs. 5 and 6, the device will still operate in substantially the same fashion by merely changing the relays to 67 and 69 so that their excitation opens instead of closes the circuit (Fig. 7). The gearing, i. e., the direction of rotation of the motor, must still be such that the drum rotates in the direction which will eventually occult the light beam which falls on the exposed cell, even though the rotation will not, for any given reading of the meter itself, continue to the point where actual occultation occurs. Where the device is used for control instead of recordation it is obvious that any desired type of switching or other operating mechanism may be substituted for the recording pen.

Many modifications of the device here described will at once suggest themselves to those skilled in the art in adapting my invention for particular services. For this reason, the terms "shutter" and "aperture" are to be interpreted as being broad enough to cover reflecting as well as transmitting shutters, i. e., mirror strips 25' and 27' as shown in Fig. 5 occupying the position of the apertures 25 and 27 and reflecting the beam from the meter back towards axially located photocells 28' and 29', come within the scope of these terms as used in this specification.

It will be noted that in my device the two photocells may be completely unbalanced, and since the establishment of balance in the device as a whole, following a change in deflection of the meter, is purely a function of the position of the shutter and not the reestablishment of the null through a potentiometer setting, the device is equally applicable to mechanical as well as electrical meters.

What I claim as new, therefore, and desire to protect by Letters Patent, is as follows:

1. The combination with a metering device of follow-up apparatus comprising a mirror mounted to respond to the movements of said device, a light source, a pair of photoelectric cells, means for directing light from said source onto said mirror and thence onto both of said cells, a movable shutter mounted in the path of said light between said mirror and said cells and apertured to permit illumination of one of said cells when moved in one direction with respect to the path of the reflected light from said mirror and of the other cell when moved in the other direction with respect to said path, and means responsive to the illumination of said cells for moving said shutter in the direction which will occult the light on the illuminated cell.

2. The combination with a metering device of follow-up apparatus comprising a mirror mounted to respond to the movements of said device, a light source, a pair of photoelectric cells, means for directing light from said source onto said mirror and thence onto both of said cells, a movable shutter mounted in the path of said light between said mirror and said cells and apertured to permit illumination of one of said cells when moved in one direction with respect to the path of the reflected light from said mirror and of the other cell when moved in the other direction with respect to said path, a motor geared to drive said shutter in either of said directions, a pair of electrical circuits operative to determine the direction of movement of said shutter in response to the closure of one or the other thereof, and relay means responsive to the illumination of said respective cells by said light for closing the proper one of said circuits to move said shutter in such direction as to occult the light on the illuminated cell.

3. The combination with a metering device of follow-up apparatus comprising a mirror mounted to respond to the movements of said device, a light source, a pair of photoelectric cells, means for directing light from said source onto said mirror and thence onto both of said cells, a movable shutter mounted in the path of said light between said mirror and said cells and apertured to permit illumination of one of said cells when moved in one direction with respect to the path of the reflected light from said mirror and of the other cell when moved in the other direction with respect to said path, a constantly operating motor, reversing gearing connecting said motor to said shutter, electrically operated means for actuating said gearing, and relay means responsive to illumination of the respective photoelectric cells by said light for exciting said actuating means to drive said shutter in the direction which will occult the light on the illuminated cell.

4. A recording meter comprising a responsive mechanism having a rotatable shaft, a mirror mounted on said shaft, means for directing light in beam form upon said mirror, a shutter drum mounted substantially coaxially with said shaft and provided with a pair of circumferential apertures in the path of the light beam as reflected from said mirror, each of said apertures occupying a portion of the circumference of said drum not occupied by the other, a pair of photoelectric cells each positioned to receive light through a respective one of said apertures, driving means geared to said drum, and means responsive to the illumination of the respective cells for actuating said driving means to rotate said drum in such direction as to occult the beam with respect to the illuminated cell.

5. The combination with a metering device of a follow-up mechanism comprising a mirror mounted to respond to the movements of said device, a photoelectric cell, a light source, means for directing a beam of light from said source to said mirror and thence to said cell irrespective of the responsive position of said mirror, means movable in the path of said beam to occult the same between said mirror and said cell, a motor for driving said occulting means, relay means actuated by said cell and operative upon illumination thereof by said beam to connect said motor to drive said occulting means in a direction tending to cause occultation of said beam, and means operative only when said beam is occulted to drive said occulting means in the opposite direction.

6. In combination with a metering device, a beam source of illumination, light directing means movable in response to the indications of said device for splitting said beam into two divergent beams, whose direction varies with the movement of said light directing means, a pair of photoelectric cells each mounted to receive the illumination of one of said divergent beams throughout its range of movement, occulting means for intercepting a respective one of said divergent beams depending upon its position with respect thereto within the range of movement thereof, reversible driving means for moving said occulting means, and relay means actuated by said photoelectric cells and operative in response to illumination of a respective one thereof to connect said driving means to move the occulting means in such direction as to intercept the light to the illuminated cell.

7. Apparatus in accordance with claim 5 wherein said light directing means comprises a mirror having two facets.

8. In combination with a metering device, a mirror movably mounted to respond to the indications thereof, means for illuminating said mirror to provide a pair of divergent light beams reflected therefrom, said beams moving with the movement of said mirror, a pair of photoelectric cells each mounted to receive the illumination of one of said divergent beams throughout its range of movement, movable means for occulting a respective one of said divergent beams depending upon its position with respect thereto within the range of movement thereof, reversible driving means for moving said occulting means, and relay means actuated by said photoelectric cells and operative in response to illumination of a respective one thereof to connect said driving means to move the occulting means in such direction as to occult the illuminated cell.

DONALD D. DUTTER.